(12) United States Patent
Earl

(10) Patent No.: US 11,586,092 B2
(45) Date of Patent: Feb. 21, 2023

(54) TUNABLE SOURCE BI-PHOTONS

(71) Applicant: QUBITEKK, INC., Bakersfield, CA (US)

(72) Inventor: Dennis Duncan Earl, San Diego, CA (US)

(73) Assignee: QUBITEKK, INC., Bakersfield, CA (US)

(*) Notice: Subject to any disclaimer, the term of this patent is extended or adjusted under 35 U.S.C. 154(b) by 0 days.

(21) Appl. No.: 15/765,988

(22) PCT Filed: Oct. 5, 2016

(86) PCT No.: PCT/US2016/055562
§ 371 (c)(1),
(2) Date: Apr. 4, 2018

(87) PCT Pub. No.: WO2017/062501
PCT Pub. Date: Apr. 13, 2017

(65) Prior Publication Data
US 2018/0292728 A1    Oct. 11, 2018

Related U.S. Application Data

(60) Provisional application No. 62/237,436, filed on Oct. 5, 2015.

(51) Int. Cl.
*G02F 1/35* (2006.01)
*H04B 10/70* (2013.01)
(Continued)

(52) U.S. Cl.
CPC .............. *G02F 1/3526* (2013.01); *G01J 9/00* (2013.01); *G02B 27/10* (2013.01); *G02F 1/39* (2013.01);
(Continued)

(58) Field of Classification Search
CPC .... G02F 1/3526; G02F 1/39; G02F 2001/212; G02F 2001/3503; G02F 2001/3505; G01J 9/00; G02B 27/10; H04B 10/70
See application file for complete search history.

(56) References Cited

U.S. PATENT DOCUMENTS 3,328,723 A     6/1967  Giordmaine et al.
4,181,899 A *   1/1980  Liu .......................... G02F 1/37
                                                        372/20
(Continued)

FOREIGN PATENT DOCUMENTS

CN          201181808 Y      1/2009
CN          101681080 A      3/2010
(Continued)

OTHER PUBLICATIONS

International Search Report and Written Opinion issued in PCT/US2016/055562 dated Dec. 23, 2016 (10 pages).
(Continued)

*Primary Examiner* — Hwa Andrew Lee
(74) *Attorney, Agent, or Firm* — Acuity Law Group, PC; Michael A. Whittaker

(57) ABSTRACT

The present invention provides devices, systems, and methods for producing bi-photons without the need for complex alignment or source design by the user. The invention provides a tunable source of high-brightness, high-visibility, bi-photons that can be configured for a number of applications.

17 Claims, 8 Drawing Sheets

(51) Int. Cl.
*G01J 9/00* (2006.01)
*G02B 27/10* (2006.01)
*G02F 1/39* (2006.01)
*G02F 1/21* (2006.01)

(52) U.S. Cl.
CPC ............ *H04B 10/70* (2013.01); *G02F 1/212* (2021.01); *G02F 1/3503* (2021.01); *G02F 1/3505* (2021.01)

(56) References Cited

U.S. PATENT DOCUMENTS

| | | | | |
|---|---|---|---|---|
| 6,047,009 A * | 4/2000 | Adachi | ................ | G02F 1/3501 372/21 |
| 6,424,665 B1 | 7/2002 | Kwiat et al. | | |
| 6,744,547 B2 * | 6/2004 | Ikeda | ................ | G02F 1/3501 359/238 |
| 6,897,434 B1 * | 5/2005 | Kumar | ................ | B82Y 10/00 250/227.18 |
| 7,489,436 B1 * | 2/2009 | Fiorentino | ................ | G02F 1/39 359/326 |
| 7,570,365 B2 | 8/2009 | Trifonov et al. | | |
| 8,514,478 B1 | 8/2013 | Spence | | |
| 2004/0141534 A1 * | 7/2004 | Hashimoto | ............ | H01S 3/025 372/22 |
| 2005/0008047 A1 * | 1/2005 | Hashimoto | ............ | G02F 1/3501 372/22 |
| 2005/0243876 A1 * | 11/2005 | Kung | ................ | G02F 1/39 372/21 |
| 2006/0072635 A1 * | 4/2006 | Wang | ................ | H01S 3/0014 372/22 |
| 2009/0232462 A1 * | 9/2009 | Creeden | ................ | G02B 6/10 385/122 |
| 2011/0243161 A1 * | 10/2011 | Tucker | ................ | G02F 1/3525 372/21 |
| 2011/0276296 A1 * | 11/2011 | Walmsley | ................ | G01J 11/00 702/85 |
| 2013/0308956 A1 | 11/2013 | Meyers et al. | | |
| 2015/0055961 A1 | 2/2015 | Meyers et al. | | |
| 2016/0041032 A1 * | 2/2016 | Matthews | ............ | G01J 3/0205 356/402 |
| 2017/0052427 A1 * | 2/2017 | Earl | ............ | G02F 1/39 |

FOREIGN PATENT DOCUMENTS

| | | |
|---|---|---|
| CN | 103149773 A | 6/2013 |
| CN | 104752944 A | 7/2015 |
| CN | 108139647 A | 6/2018 |
| EP | 3360010 A1 | 8/2018 |
| JP | H11271823 A | 10/1999 |
| JP | 2000089006 A | 3/2000 |
| JP | 2001024264 A | 1/2001 |
| JP | 2002033718 A | 1/2002 |
| JP | 2004272082 A | 9/2004 |
| JP | 2005050847 A | 2/2005 |
| JP | 2006064885 A | 3/2006 |
| JP | 2007286530 A | 11/2007 |
| JP | 2015114539 A | 6/2015 |
| WO | 20040095124 A1 | 11/2004 |
| WO | 2009093431 A1 | 7/2009 |
| WO | 2012061944 A1 | 5/2012 |
| WO | 2012126495 A1 | 9/2012 |
| WO | 2017062501 A1 | 4/2017 |

OTHER PUBLICATIONS

Office Action issued by SIPO in PRC Patent Application No. 201680059036.4 dated Jul. 3, 2020—incl Engl lang transl. (11 pages total).

Office Action issued by the JPO in Japanese Patent Application No. 2018-536716 dated Aug. 6, 2020—incl Engl lang transl. (19 pages total).

Pproduct description for MasterSil 800 silicone elastomer adhesive (1 page).

Bennink et al., Spatial distinguishability of photons produced by spontaneous parametric down-conversion. Physical Review A 2006;74:023802 (7 pages).

Extended European Search Report issued in EP 16854246 dated May 16, 2019.

De Chatellus et al., Non-collinear and non-degenerate polarization-entangled photon generation via concurrent type-I parametric down-conversion in PPLN. Opt Express. Oct. 16, 2006;14(21):10060-10072.

Fejer et al., Quasi-Phase-Matched Second Harmonic Generation: Tuning and Tolerances IEEE J Quantum Electron. 1992;28(11):2631-2654.

Fiorentino et al., Spontaneous parametric down-conversion in periodically poled KTP waveguides and bulk crystals. Opt Express. Jun. 11, 2007;15(12)7479-7488.

Kuklewicz et al., High-flux source of polarization-entangled photons from a periodically poled KTiOP04 parametric down-converter. Phys Rev A2004;69:013807.

Kwiat et al., New High-Intensity Source of Polarization-Entangled Photon Pairs. Phys Rev Lett. Dec. 11, 1995;75(24):4337-4341.

Kwiat et al., Ultra-bright source of polarization-entangled photons. Phys Rev A 1999;60:1-4.

Kwiat, Nonclassical Effects from Spontaneous Parametric Down-Conversion: Adventures in Quantum Wonderland. PhD Dissertation Thesis for Dr of Philosophy in Physics at UC Berkeley 1993, 324 pages.

Office Action issued by SIPO in PRC Patent Application No. 201680059036.4 dated Mar. 4, 2021—incl Engl lang transl. (10 pages total).

Office Action issued by the JPO in Japanese Patent Application No. 2018-536716 dated May 6, 2021—incl Engl lang transl. (14 pages total).

Extended European Search Report issued in European U.S. Appl. No. 21/187,844 dated Feb. 17, 2022 (13 pages).

* cited by examiner

TUNABLE SOURCE BI-PHOTONS

CROSS-REFERENCE TO RELATED APPLICATIONS

The present invention is filed under 35 U.S.C. § 371 as the U.S. national phase of International Patent Application No. PCT/US2016/055562, filed Oct. 5, 2016, which designated the United States and claims the benefit of U.S. Provisional Application Ser. No. 62/237,436, filed on Oct. 5, 2015, the entire disclosure of each of which is incorporated herein by reference, including the drawings.

FIELD OF THE INVENTION

This The present invention relates to the field of bi-photons and ways to generate them reliably and in a commercially-viable manner for use in any of a variety of applications, including but not limited to quantum computing, quantum sensing, and quantum encryption and communication systems.

BACKGROUND OF THE INVENTION

The following discussion of the background of the invention is merely provided to aid the reader in understanding the invention and is not submitted to describe or constitute prior art to the present invention.

Quantum theory was developed in the early 1900's when classical physics could not explain the behavior of atomic and sub-atomic systems or weak fields. Over the past decade, quantum information science has become an active area of scientific inquiry and commercial development. Many of the technologies and phenomena being investigated today, such as quantum cryptography and quantum computing, involve the manipulation or detection of single photons, the basic quantized particle of light. Although it is relatively easy to produce millions of photons at once, for example a light bulb does this whenever energized, it is much more challenging to produce only a single photon reliably and consistently. Toward this goal, the use of non-linear optical crystals that convert photons from a high frequency to a lower frequency, a process called parametric down-conversion, has been studied extensively. In the parametric down-conversion process, a "pump" photon of wavelength $\lambda$ is down-converted into two photons, each with wavelength $2\lambda$. The two generated photons are termed the "signal" and "idler" photons. There are two photons produced for every one pump photon because the energy of the system must be conserved, and one photon at wavelength $\lambda$ has the same energy as two photons at wavelength $2\lambda$.

The parametric down-conversion process is a very inefficient process. The pump photons must be linearly polarized along a specific axis relative to the crystal axis and for every billion photons that enter the crystal, only one might actually get down-converted. This inefficiency makes it an excellent method for producing small numbers of photons. In addition, because the down-converted signal and idler photons are both generated at exactly the same time and from the same point in the crystal, they will have similar properties and are often useful for investigating or realizing different quantum phenomena, such as quantum entanglement. The down-converted signal and idler photons are often referred to collectively as a bi-photon or bi-photon pair.

Bi-photons can be used in quantum technology in a number of ways. One example is the use of bi-photons to herald the production of a single photon. Because it is difficult to predict when a single photon will be generated, one of the photons in a bi-photon pair can be separated and used to trigger a "heralding" detector. Positive detection heralds that another undetected single photon is present in the system. Bi-photons can also be used to produce entangled photons. Entangled photons involve at least two photons where each photon's quantum state is dependent on the other photon's quantum state. The output of two phase-matched bi-photon sources can be combined at a polarizing beamsplitter to create entangled photon pairs. In addition, when two photons in a bi-photon pair are alike in every way, a condition termed "indistinguishable," they can be used to create and study quantum interference phenomena. Quantum interference is a phenomenon critical to many emerging quantum technologies.

Early demonstrations of bi-photon production utilized beta-Barium Borate ($\beta$-$BaB_2O_4$, hereinafter "BBO") or Potassium Titanium Oxide Phosphate ($KTiOPO_4$, hereinafter "KTP") crystals that produced spatially-separated signal and idler photon emissions. Improvements to this approach were realized with two major advances in methodology. These improvements, which generated a larger number of bi-photon pairs, exploited the geometry of the non-collinear parametric down-conversion emissions. Both were proposed and realized by Kwiat et al. (P. Kwiat, K. Mattle, H. Weinfurter, and A. Zeilinger, "New High-Intensity Source of Polarization-Entangled Photon Pairs", Physical Review Letters 75, 4337 (1995); P. Kwiat, E. Waks, A. White, I. Appelbaum, and P. Eberhard, "Ultra-bright source of polarization-entangled photons", Physical Review A 60, 773 (1999)).

More recently, progress has been made in the collinear regime. The success of collinear parametric down-conversion is due to a crystal manufacturing procedure that yields a periodic nonlinearity to the crystal structure. Emissions within periodically-poled crystals can occur with non-critically phase-matched configurations in materials with large nonlinear coefficients. This has led to significant increases in bi-photon source brightness (C. Kuklewicz, M. Fiorentino, G. Messin, F. Wong, and J. Shapiro, "High-flux source of polarization-entangled photons from a periodically poled KTiOPO4 parametric down-conver,er", Physical Review A 69, 013807 (2004)).

Some of the brightest sources of bi-photons demonstrated, to date, utilize periodically-poled crystals in a waveguide structure. Waveguide periodically-poled KTP allows a pair generation rate that is more than 50 times higher (or brighter) than the non-periodically poled, non-waveguide bulk crystal KTP generation rate (M. Fiorentino, S. Spillane, R. Beausoleil, T. Roberts, P. Battle, and M. Munro, "Spontaneous parametric down-conversion in periodically poled KTP waveguides and bulk crystals", Optics Express 15, 7479 (2007)).

Source performance also becomes better as new engineering techniques and models emerge, e.g. determination of optimal focusing techniques to enable better fiber coupling (R, Bennink, Y. Liu, D. Earl, and W. Grice. "Spatial distinguishability of photons produced by spontaneous parametric down-conversion", Physical Review A 74, 023802 (2006)). System design can help the performance as well, e.g. improved mounting of a non-linear crystal by encapsulating it within an optically clear material (P. Kwiat, PhD Thesis; "Nonclassical effects from spontaneous parametric down-conversion: adventures in quantum wonderland.").

Patents related to packaging a bi-photon source include U.S. Pat. No. 6,897,434, "All-fiber photon-pair source for quantum communications," issued May 24, 2005 to Kumar.

Kumar describes a source and/or method of generating quantum-entangled bi-photon pairs using parametric fluorescence in a fiber whose dispersion zero is close to that of the pump wavelength, and specifically, a Sagnac loop at wavelengths around 1550 nm, with detectors in "that window (1000-1600 nm)." A commercial product (EPS-1000) by the company NuCrypt, LLC, claims to practice the teachings of this patent. Another patent, U.S. Pat. No. 6,424,665 to Kwiat, "Ultra-bright source of polarization-entangled photons," describes a polarization entangled and bi-photon source using spontaneous parametric down-conversion in a multi-crystal geometry. Emerging applications for quantum technology create an increasing demand for ever more stable, efficient, on-demand, and high-quality sources of bi-photons. There is, therefore, a need for a source that can be readily configured and provided to an end-user to produce a rugged, bright, and flexible source to serve the quantum sensing, quantum cryptography, and quantum computing fields.

SUMMARY OF THE INVENTION

It is an object of the present invention to provide systems and methods for producing bi-photons which can be used in the production of entangled photons, heralded photons, on-demand single photons, or used for investigating or exploiting quantum interference phenomena. As described hereinafter, the present invention provides a scalable system with tunable efficiency, tunable spectral output, and tunable optical phase without the need for complex alignment or source design by the user.

In a first aspect, the present invention provides systems/devices for generating bi-photons. These systems comprise:
  a nonlinear crystal element comprising a first face, a second face parallel to the first face, and a first axis perpendicular to the first and second faces;
  a crystal holder configured to mechanically support the crystal and provide a thermal conduit between the crystal and the crystal holder;
  a thermal element attached to the crystal holder configured to heat and/or cool the crystal holder and the nonlinear crystal element;
  a thermal sensor operably connected to the crystal holder and configured to measure the temperature of the crystal holder and/or the nonlinear crystal element;
  a thermal control circuit operably connected to the thermal sensor and the thermal element and configured to control the temperature of the crystal holder to within +/−0.1 degrees Celsius;
  a crystal holder mount configured to mechanically support the crystal holder while thermally isolating the crystal holder from the rest of the device components;
  a pump focusing optic configured to produce a converging pump beam from the linearly polarized output of a polarization-maintaining optical fiber and provide translational adjustment of the position of the produced pump beam relative to the first axis, the pump beam traversing a first optical path to a first face of the nonlinear crystal element along the first axis, the non-linear crystal element providing down-conversion of a subset of photons in the pump beam, resulting in a beam of down-converted bi-photons and a beam of non-down-converted photons along the first axis;
  an optical element comprising a dichroic reflector configured to receive photons exiting a second face of the nonlinear crystal element along the first axis and to direct down-converted bi-photons to a third optical path along the first axis, and to reflect non-down-converted photons to a fourth optical path along a third axis; and
  a bi-photon focusing optic configured to collect the down-converted photons into an optical fiber and provide adjustment of the optical fiber's optical axis relative to the first axis.

The term "bi-photon" refers to two photons created simultaneously from the same point in space.

In certain preferred embodiments, the systems and devices of the present invention comprise a phase shifting wave plate positioned in the first optical path between the pump focusing optic and the first face of the nonlinear crystal element.

The phase shifting wave plate is a variable wave plate positioned in the first optical path between the pump focusing optic and the first face of the non-linear crystal. The skilled artisan understands that a variable wave plate (or retarder) is an optical device that slows the propagation of polarized light travelling through it along a defined axis. Variable wave plates may be constructed according to a variety of methods and from a variety of materials readily known to persons of ordinary skill in the art. In a typical example, a variable wave plate may be constructed from a liquid crystal device that allows the index of refraction of the wave plate material to be adjusted electronically. Such devices can comprise a transparent cell filled with a solution of liquid crystal (LC) molecules. Two parallel faces of the cell wall are coated with a transparent conductive film so that a voltage can be applied across the cell. The orientation of the LC molecules is determined by the alignment layer in the absence of an applied voltage. When an AC voltage is applied, the molecules will change from their default orientation based on the applied rms value of the voltage. Hence, the phase offset in a linearly-polarized beam of light can be actively controlled by varying the applied voltage.

In certain preferred embodiments, the systems and devices of the present invention can comprise a polarization rotating pre-crystal wave plate positioned in the first optical path between either the phase shifting wave plate, if present, and the first face of the non-linear crystal element, or the pump focusing optic, if the phase shifting wave plate is not present, and the first face of the nonlinear crystal. The polarization rotating pre-crystal wave plate may be a manually or electronically rotatable half-wave plate or variable wave plate. The skilled artisan understands that a wave plate (or retarder) is an optical device that can alter the polarization state of a light wave travelling through it. A common type of wave plate is the half-wave plate. When the polarization axis of the half-wave plate is rotated by 0° relative to polarization axis of an optical beam, the polarization of the optical beam after the half-wave plate will be rotated by 2θ°. Wave plates are typically constructed out of a birefringent material such as quartz or mica. A wave plate can be rotated my manual mechanical means or through the use of electric motors and actuators. The polarization rotating pre-crystal wave plate may also be an electronically variable wave plate, where the electronic control of the variable wave plate is such that the wave plate can be controlled to either be "on" or "off." When configured in the "on" configuration, the electronically variable wave plate behaves as a fixed half-wave plate and produces a polarization rotations. When configured in the "off" configuration, the electronically variable wave plate does not produce any polarization rotation of the beam. In a preferred embodiment, the polarization rotating pre-crystal wave plate is a half wave plate configured manually to modify the polarization state of the pump beam, thereby altering the efficiency of down-converted bi-photon production by the system.

In preferred embodiments, the pump focusing optic produces a converging beam from photons emitted from the end of a polarization-maintaining singlemode optical fiber. The pump focusing optic is positioned with a translating mount that allows the position of the produced beam to be made collinear to the first axis and focused near or at the center of the nonlinear crystal element's length. Once aligned during manufacture, the translating mount may be "locked down" so that no end user adjustment is necessary.

In certain embodiments, the systems and devices of the present invention can comprise a filter positioned between the non-linear crystal element and the pump focusing optic in the first optical path. When other elements are present between the non-linear crystal element and the pump focusing optics, the filter is positioned immediately preceding the non-linear crystal element. This filter is preferably configured to remove photons that have a wavelength different from the intended pump wavelength. By way of example, if the pump wavelength is 405 nm, a 40 nm bandwidth notch filter centered at 390 nm could be used to prevent unwanted photons created by fluorescence or harmonic generation from reaching the non-linear crystal element.

The nonlinear crystal element of the present invention may be made of a variety of materials known in the art, including but not limited to LBO, CLBO, BBO, KTP, KDP, AGS, AGSE, SBN, BSO, $LiO_3$, and $LiNbO_3$. The nonlinear crystal element is selected to produce Type 0, I, or II downconversion of a portion of photons passing through the crystal matrix. A nonlinear crystal converts higher energy photons into pairs of lower energy photons that, in accordance with the law of conservation of energy, have combined energies and momenta equal to the energy and momentum of the original photon, are phase-matched in the frequency domain, and have correlated polarizations. Spontaneous parametric down-conversion (SPDC) in a certain low percentage of photon pairs are created at random times.

The nonlinear crystal is preferably potted in potting material having an index of refraction lower than the index of refraction of the non-linear crystal. The potting material serves three purposes. First, it seals the crystal and limits the absorption of water from the environment. Second, it provides a mechanical retention of the crystal that maintains the position of the crystal while also inhibiting the transfer of mechanical shock to the crystal. Third, it provides a thermal pathway between the non-linear crystal element and the crystal holder. To satisfy all of these purposes, the potting material should have a thickness between the non-linear crystal and the crystal holder no less than 0.1 mm and no greater than 2 mm. Suitable materials are preferably optically transparent at the desired wavelengths. Suitable materials include silicone-based rubbers such as NuSil LS-6941 and LS-6140, Sylgard® Silicone Elastomer (Dow Corning), and ELASTOSIL® Solar 2202 (Wacker).

In a preferred embodiment, after exiting the second face of the nonlinear crystal, photons may be separated by a dichroic mirror into downconverted bi-photons along a first path, and non-downconverted photons along a second optical path.

In certain preferred embodiments, a recycling focusing optic is configured to collect the non-downconverted photons directed down the second optical path into an optical fiber and provide adjustment of the optical fiber's optical axis relative to the second axis. The purpose of collecting these non-downconverted photons is to make them available for potential reuse in pumping additional non-linear crystals.

In certain preferred embodiments, the non-downconverted photons exiting the dichroic mirror travel through a polarization rotating recycling wave plate located between the dichroic mirror and the recycling focusing optic. The polarization rotating recycling wave plate may be a half-wave plate or electronic variable wave plate. In a preferred embodiment, the polarization rotating recycling wave plate is a half wave plate configured manually to reverse the polarization modifications made to the pump beam photons by the polarization rotating pre-crystal wave plate.

Because the efficiency of downconversion is low, there is little loss of intensity in the recycled pump beam. The "recycled" pump beam can be provided to a second device which can also provide a "recycled" pump beam to a third device, which can provide a "recycled" pump beam to a fourth device, etc. This allows for scalability of the systems described herein, meaning one or more devices can be provided as a linked array, all receiving an initial "pump" from a single photon source at the first device, and other devices in the chain being linked to this single photon source through the recycled non-downconverted photons collected from the previous device in the series.

Furthermore, as described in additional detail hereinafter, by adjusting the polarization of the pump beam relative to the first axis individually in each of $dev_1$ through $dev_n$ (where $dev_1$ is device one and $dev_n$ is the nth, or final, device in the series) one is able to modify the efficiency of downconverted bi-photon production by each device in the series to make the bi-photon output from each device approximately identical.

Furthermore, the phase of the recycled pump beam entering $dev_n$ may be adjusted relative to the original pump beam entering $dev_1$ to create a phase difference between the bi-photons produced from $dev_1$ and from $dev_n$.

In certain embodiments, the systems and devices of the present invention can comprise a tilted window positioned between the dichroic mirror and the bi-photon focusing optic. The tilted window introduces a beam displacement that can compensate for any beam displacement introduced by the thickness of the tilted dichroic mirror. In a preferred embodiment, the tilted window would exactly displace the down-converted photons such that they were collinear with the first axis after displacement.

In certain embodiments, the systems and devices of the present invention can comprise a bi-photon filter positioned between the dichroic mirror and the bi-photon focusing optic. When other components are present between the dichroic mirror and the bi-photon focusing optic, the filter would be positioned immediately preceding the bi-photon focusing optic. In a preferred embodiment, the filter would be a 780 nm long pass filter that transmitted bi-photon wavelengths above 780 nm while reflecting or absorbing shorter wavelength photons.

BRIEF DESCRIPTION OF THE DRAWINGS

The foregoing and other features of the present invention will become apparent to one skilled in the art to which the present invention relates upon consideration of the following description of the invention with reference to the accompanying drawings. Other embodiments of the invention will be apparent from the following detailed description, figures, and claims.

DETAILED DESCRIPTION OF THE INVENTION

Figure 1:
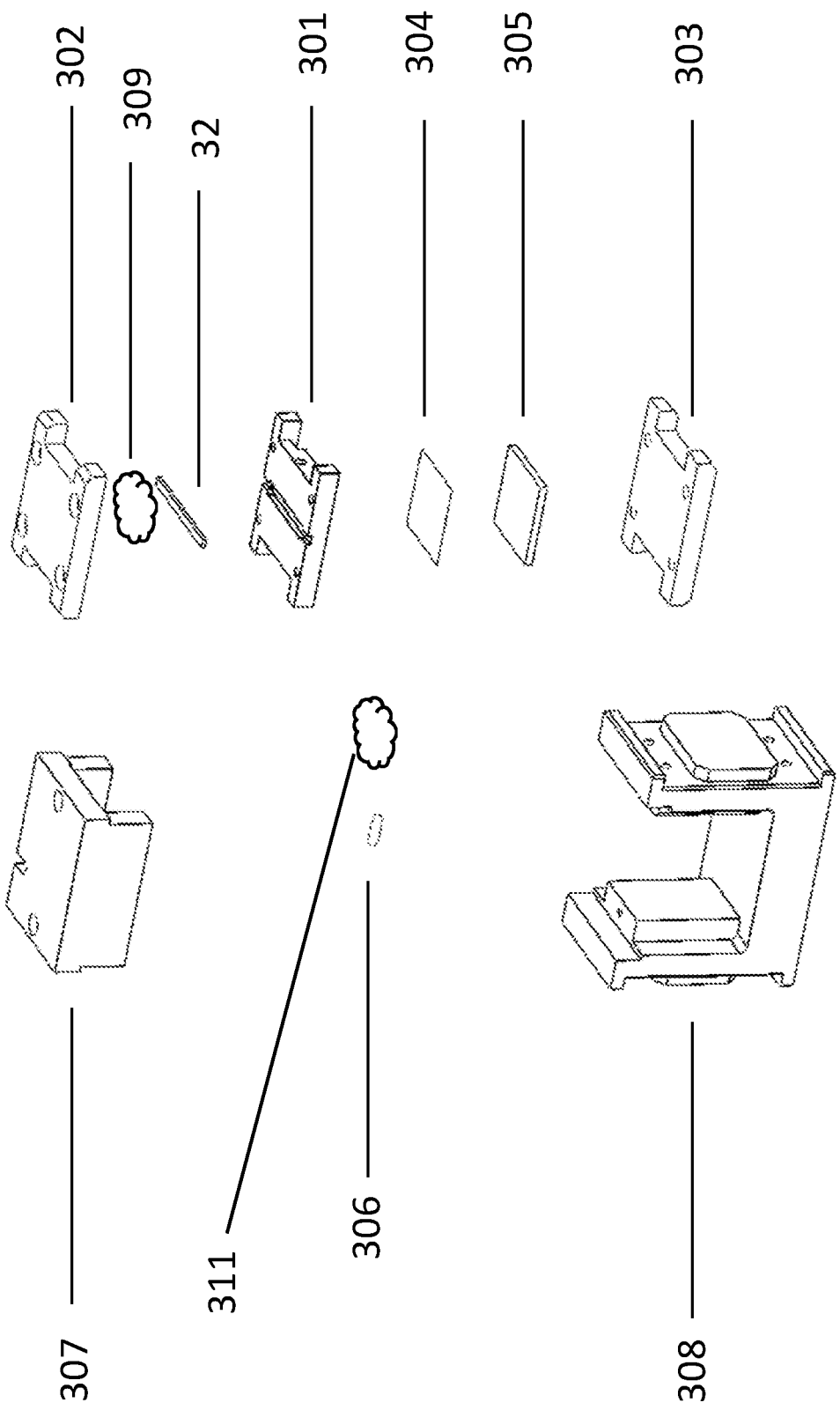
FIG. 1 depicts an exploded view of the components in a design of an exemplary system to mechanically support and thermally control a non-linear crystal.

FIG. 1 depicts a schematic of a design of a system to mechanically hold and thermally control a non-linear crystal element 32. The system comprises a non-linear crystal element 32 attached to a crystal holder 301 preferably using a potting material 309. The potting material 309 ensures that the crystal is securely held in a level position relative to the crystal holder 301 while also providing a level of shock absorption for any mechanical shock that might be transferred from the outside environment to the non-linear crystal element 32. In addition, the potting material 309 ensures that most of the non-linear crystal element's 32 surface is sealed against water intrusion. Water-absorption in non-linear crystals can lead to crystal damage or changes in the crystal's optical properties over time. Furthermore, the potting material 309 provides a thermal pathway for heat to transfer to and from the non-linear crystal element 32. Because the potting material is more of an insulator than a conductor, the thickness of the potting material between the non-linear crystal element 32 and the crystal holder 301 is preferably relatively small. Preferably, the potting material thickness is in the range of 0.01 mm to 2.0 mm, and most preferably 0.5 mm. The crystal holder 301 is made of a thermally conductive material such as copper or aluminum.

The crystal holder 301 has a thermal element 305 attached to the bottom of the crystal holder 301 preferably with a thermal element epoxy 304. The thermal element epoxy 304 can be either a thermal paste, such as an alumina paste, or a thermal epoxy, such as an alumina epoxy. The thermal element 305 can either be a heating element, a cooling element, or both. A person of ordinary skill in the art would recognize that there are a number of ways to heat and/or cool a device. In a preferred embodiment, a peltier element is used as the thermal element 305 to either heat or cool the assembly as desired.

Varying the temperature of a non-linear crystal will result in a variation in the index of refraction of the crystal and, subsequently, will alter the wavelengths of the collinear signal and idler photons produced (M. M. Fejer, G. A. Magel, D. H. Jundt, and R. L. Byer, "Quasiphase-matched second harmonic generation: tuning and tolerances," IEEE J. Quantum Electron. 28, 2631-2654 (1992).) Increasing the temperature of a non-linear crystal causes the wavelengths of the signal and idler photons to change. For every crystal, there does exist, however, a specific temperature where the signal and idler photons have the same wavelength. We call this temperature the "Operating Temperature" for the bi-photon source.

In creating photons for applications herein, it is often desirable to have signal and idler photons produced with identical wavelengths. Producing photons with identical wavelengths is a key requirement in making the photons "indistinguishable" from one another. Indistinguish-ability between two photons is a quantum feature often desired to observe and exploit certain quantum phenomena. To achieve the identical signal and idler wavelengths in an efficient manner, very precise regulation of the temperature of the non-linear crystal element 32 is highly desirable.

Figure 8:
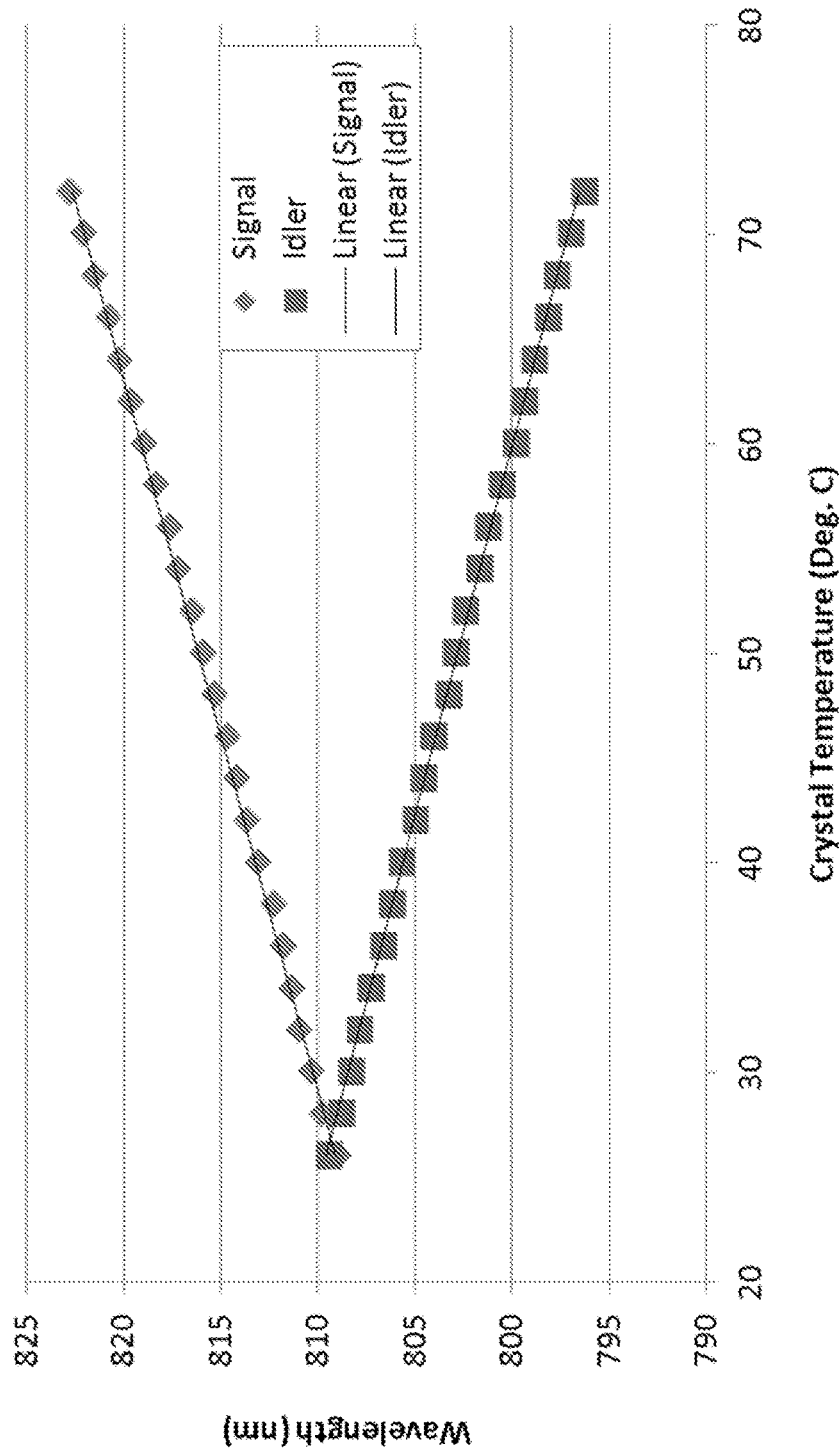
FIG. 8 is a graph that illustrates how the wavelength of a signal and idler photon—generated through down-conversion of a pump photon in a non-linear crystal—is dependent upon the crystal's temperature. An increase in the crystal temperature can be seen producing an increase in the signal photon's wavelength while producing a similar decrease in the idler photon's wavelength. At some specific crystal temperature, the signal and idler photons will have identical wavelengths. The precise temperature at which a particular crystal will produce such photons varies based upon the crystal and aspects of its installation within the system. Also, as discussed herein, the properties of the crystal can vary over time. The graph is therefore illustrative and one example.

By varying the temperature of the non-linear crystal, the wavelengths of the signal and idler photons produced can vary as illustrated in the exemplary graph in FIG. 8. As can be seen in FIG. 8, a crystal temperature exists which can produce signal and idler photons of the same wavelength. Using preferred construction and materials as disclosed herein, along with the heating/cooling, and sensing elements, we have discovered that this temperature is optimally maintained to better than 0.1 degrees Celsius to make the photons indistinguishable and suitable for many quantum computing, quantum cryptography, and quantum sensing applications. To achieve this goal, a temperature control system is needed to control the temperature of the crystal mount 310. A thermal sensor with higher sensitivitity than 0.1 degrees Celsius, most preferably with a sensitivity of 0.01 degree Celsius, is optimal to accurately maintain a desired crystal temperature.

Moreover, as discussed herein, the wavelengths produced by a particular crystal in a particular installation can vary, and as noted, can also vary over time as temperatures fluctuate. FIG. 8 is therefore understood as one example of a particular crystal in a particular installation. Using the system disclosed herein enables a user, as explained, to tune the device to produce desired wavelengths in the device and system, either identical or otherwise, and tune and adjust that particular device given its conditions such that it efficiently and reliably produces photons of the desired wavelengths.

For this purpose, the crystal holder 301 has a thermal sensor 306 attached to the side of the crystal holder 301, preferably with a thermal sensor epoxy 311. The thermal sensor epoxy 311 can be either a thermal paste, such as an alumina paste, or a thermal epoxy, such as an alumina epoxy. The thermal sensor 306 measures the temperature of the crystal holder 301 and, thereby, the approximate temperature of the non-linear crystal element 32. In a preferred embodiment, the thermal sensor 306 is be sensitive to temperature changes as low as 0.01 degrees Celsius. The thermal sensor 306 can be a thermocouple or a resistive sensor. In a preferred embodiment, the non-linear crystal element 32, crystal holder 301, thermal sensor 306, and thermal element 305 are mounted between an insulating thermal jacket top 302 and a thermal jacket bottom 303. In a preferred embodiment, the thermal jacket top 302 and thermal jacket bottom 303 are made from a thermally insulating but mechanically rigid material, such as PEEK (Polyether ether ketone) plastic. In a preferred embodiment, the thermal jacket top 302 and thermal jacket bottom 303 thermally isolate the non-linear crystal element 32, crystal holder 301, thermal sensor 306, and thermal element 305 from the surrounding environment, while rigidly fixing it in place so that the elements can be properly aligned and maintained in relationship to one another and other components of the systems described herein.

In a preferred embodiment, the non-linear crystal element 32, crystal holder 301, thermal sensor 306, thermal element 305, thermal jacket top 302, and thermal jacket bottom 303 are mounted between a mechanically rigid fixed mount top 307 and a fixed mount bottom 308. In a preferred embodiment, the fixed mount top 307 and fixed mount bottom 308 are made from a mechanically rigid material, such as aluminum or PEEK (Polyether ether ketone) plastic. The fixed mount top 307 and fixed mount bottom 308 rigidly hold the assembly together and ensure that the optical alignment of the non-linear crystal element 32 is maintained. In a preferred embodiment this is achieved by two sets of features on the inside and outside of the fixed mount bottom 308. The inside set of features creates a track along which the crystal holder 301, the thermal jacket top 302, and the thermal jacket bottom 303 are guided into position. When the fixed mount top 307 is positioned on top of these three elements, the assembly becomes rigidly fixed and results in the precise and repeatable alignment of the non-linear crystal element's 32 within the assembly. The outside set of features on the fixed mount bottom 308 create a track that can be used to attach and precisely align external optical components and mechanical mounts to the crystal mount 310 and to the non-linear crystal element 32.

Figure 2:
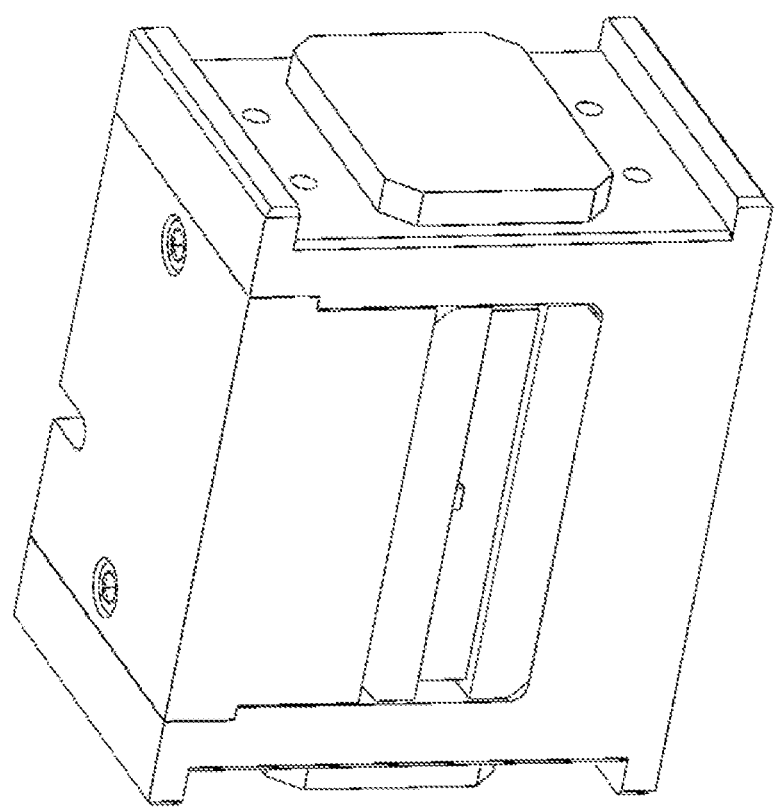
FIG. 2 depicts a collapsed view of the components in a design of an exemplary system to mechanically support and thermally control a non-linear crystal.

FIG. 2 shows a collapsed view of a design for a crystal mount 310. The crystal mount 310 is comprised of the non-linear crystal element 32, crystal holder 301, thermal sensor 306, thermal sensor epoxy 311, thermal element 305, thermal element epoxy 304, thermal jacket top 302, thermal jacket bottom 303, fixed mount top 307 and fixed mount bottom 308.

Figure 3:
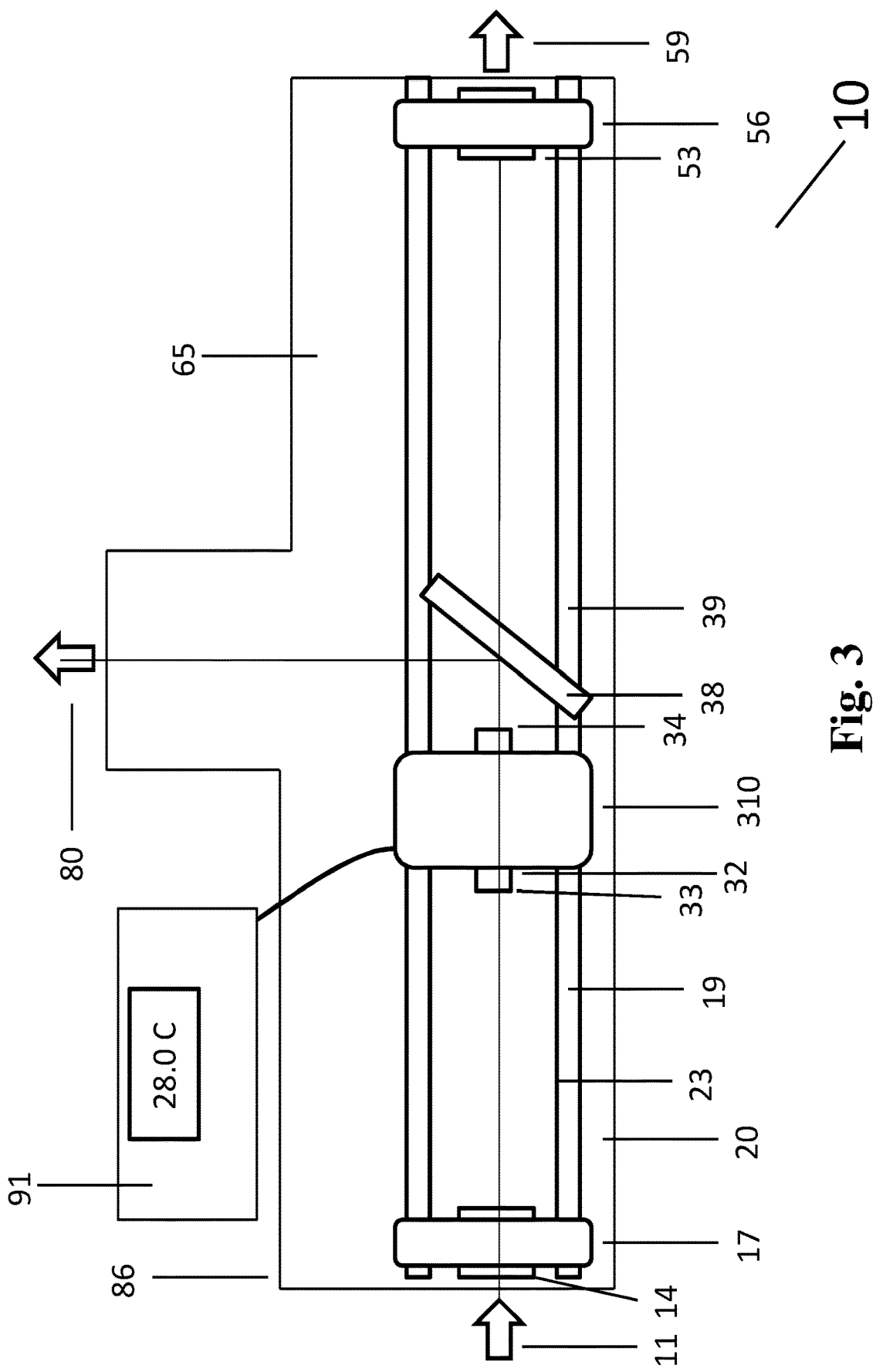
FIG. 3 depicts a schematic of a design of an exemplary system to generate bi-photons.

FIG. 3 depicts a schematic of a design of a system to generate bi-photons 10. The system comprises a source side and a receiver side. The source side comprises a laser pump 11 that is delivered to the system through a fiber optic cable. In a preferred embodiment, the fiber optic cable is a singlemode, polarization-maintaining optical fiber, but can also be a multimode or singlemode non-polarization-maintaining fiber. The optical fiber is connected to the system through an optical fiber focusing device 14. The focusing device comprises one or more lens(es) to focus the fiber output. The focusing device 14 is mounted with a first translating mount 17. The first translating mount 17 allows the x-translation, y-translation, tip, tilt, and focal point placement of the fiber output to be precisely adjusted. In a preferred embodiment, adjustments are made through alignment screws in the mount and can be locked down with one or more set screws once all alignments are finalized.

The laser light continues through the optical fiber focusing device 14 and converges onto and into the non-linear crystal 32. The non-linear crystal has a first face 33 and a second face 34.

In a preferred embodiment, the non-linear crystal 32 is housed in a crystal mount 310 such that its alignment along the optical axis is precise and stable, preferably to within 0.1°. As a person of ordinary skill in the art would readily apprehend, the non-linear crystal 32 may be comprised of a single crystal constructed from bulk non-linear materials (i.e. BBO, KTP, etc.), periodically-poled crystals (i.e., periodically-polled KTP (or "PPKTP")), or waveguide-structured crystals. The crystals may be fabricated to produce either Type 0, Type I, or Type II downconversion. In such embodiments, the polarization of the incident laser light would correspond with the axis of the crystal to result in bi-photon production.

The non-linear crystal 32 is mounted in a crystal mount 310 that rigidly positions the crystal 32 relative to the optical axis. The crystal will output photons that include both the laser's photon wavelength as well as the down-converted output from the non-linear crystal 32, which will generally be twice the wavelength of the laser.

In a preferred embodiment, the thermal element 305, thermal sensor 306, and thermal control circuit 91 allows the temperature of the non-linear crystal element 32 to be increased or decreased to maintain a temperature, preferably between 5 degrees Celsius and 90 degrees Celsius, to within a high tolerance, preferably 0.1 degrees Celsius. The heating or cooling of the non-linear crystal element 32 allows the wavelength of the down-converted photons to be tuned over a range of 30 to 40 nanometers. The thermal control circuit 91 would be any electrical circuit that could implement a proportional-integral-derivative, or PID, control loop. As a person of ordinary skill in the art would readily apprehend, there are a number of digital and analog based circuits and products that can be used to implement a PID control loop, such as those available from Omega Engineering.

Preferably, the design of the thermal control circuit 91 and the crystal mount 310 should be such that the heating or cooling delivered to the crystal mount 310 is very precise and does not overshoot or undershoot a target temperature. As such, the thermal mass and capacity of the crystal mount 310 and the response time of the thermal control circuit 91 should be consistent with one another to avoid "ringing" or "hunting" in the final control temperature. Furthermore, the crystal mount 310 should be thermally isolated from the rest of the assembly but at the same time should allow intimate thermal communication of any heating or cooling energy to the the non-linear crystal element 32. These preferences significantly impact the mechanical and thermal design of the crystal mount 310.

In a preferred embodiment, the output from the non-linear crystal 32 exits from the second face 34 and is directed toward a dichroic mirror 38. The dichroic mirror 38 separates the remaining laser pump beam from the down-converted photons. The laser pump beam reflects from the dichroic mirror 38 down a separate optical path, creating a recycled beam 80.

The down-converted photons pass through the dichroic mirror 38 to the bi-photon focusing element 53. The bi-photon focusing element 53 is comprised of one or more lenses mounted relative to a fiber optic connector and mounted in a bi-photon 5-axis alignment mount 56. The bi-photon focusing element 53 concentrates and focuses the light toward the attached fiber optic connector, creating a bi-photon beam 59 that can be efficiently coupled into an attached single or multimode optical fiber.

The first translating mount 17 and crystal mount 310 are held rigidly in place. In a preferred embodiment, that is accomplished in part by a cage design consisting of a first set of four bars connected at different points between the first translating mount 17 and the crystal mount 310, one of which is indicated at 19.

The crystal mount 310, dichroic mirror 38, and bi-photon 5-axis alignment mount 56 are held rigidly in place. In a preferred embodiment, that is accomplished in part by a cage design consisting of a second set of four bars connected at different points between the crystal mount 310 and the bi-photon 5-axis alignment mount 56, one of which is indicated at 39.

Most preferably, the first and second cages are also held in place by rigid mounting of the components to a plate 86. A light-tight housing encompasses the entire assembly and mounts to the plate 86.

Figure 4:
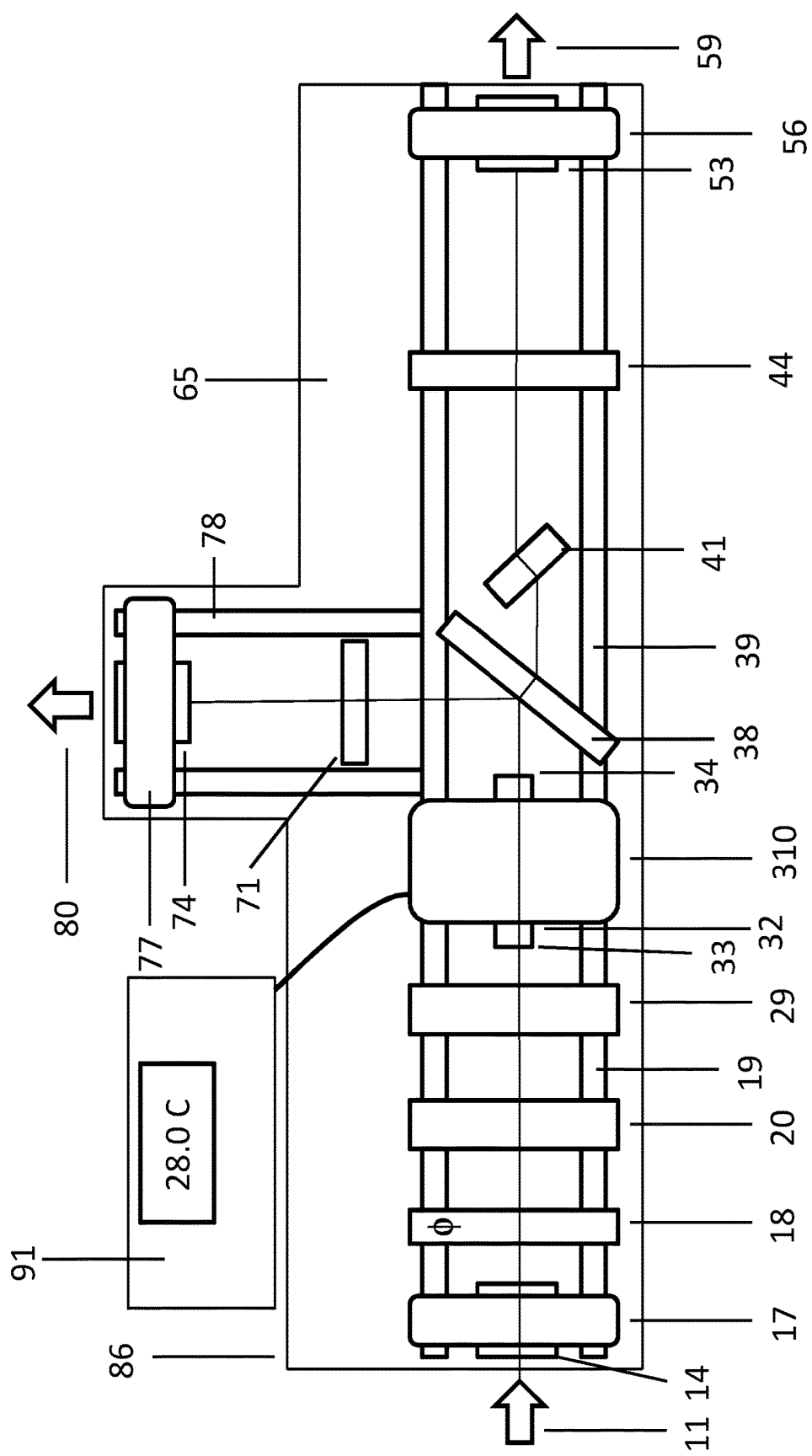
FIG. 4 depicts a schematic of a design of an exemplary system to generate bi-photons incorporating an optional phase shifting wave plate, an optional polarization rotating pre-crystal wave plate, an optional optical filter, an optional polarization rotating recycling wave plate, an optional recycling focusing optic, an optional tilted window, and an optional refining optical filter.

FIG. 4 depicts a schematic of a design of a system to generate bi-photons, incorporating optional components.

The system comprises a source side and a receiver side. The source side comprises a laser pump 11 that is delivered to the system through a fiber optic cable. The optical fiber is connected to the system through an optical fiber focusing device 14. The focusing device 14 is mounted with a first translating mount 17. The first translating mount 17 allows the x-translation, y-translation, tip, tilt, and focal point placement of the fiber output to be precisely adjusted.

The laser is directed through an optional phase shifting wave plate 18. In a preferred embodiment shown in FIG. 4, the optional phase shifting wave plate 18 is located immediately after the first translating mount 17, though the optional phase shifting wave plate 18 could have been placed anywhere between the first translating mount 17 and the non-linear crystal 32.

In a preferred embodiment, the optional phase shifting wave plate 18 is a variable wave plate, preferably an electronically variable wave plate constructed from a liquid crystal device. The optional phase shifting wave plate is made of a material (such as a liquid crystal) that has a polarization dependent index of refraction that can be adjusted electrically. The optional phase shifting wave plate is oriented such that its optical fast axis is aligned with the polarization axis of the laser pump 11.

In a preferred embodiment, the optional phase shifting wave plate can be electronically adjusted to introduce a varying phase shift to the incoming pump beam. This arrangement allows the phase of the pump beam to be controlled relative to other systems, a process that is useful when the outputs from multiple systems are combined.

The laser continues through the optional phase shifting wave plate 18 to an optional polarization rotating pre-crystal wave plate 20. The optional polarization rotating pre-crystal wave plate 20 can either be configured manually (i.e. through a manual rotation) or electronically (i.e. through a liquid crystal medium or other optical phase manipulating media). The optional polarization rotating pre-crystal wave plate allows the polarization of the pump beam to be modified, having the result of reducing the down conversion efficiency production of the non-linear crystal 32.

The optional polarization rotating pre-crystal wave plate 20 could have been placed anywhere between the first translating mount 17 and the non-linear crystal 32.

The laser light continues through the optional polarization rotating pre-crystal wave plate 20 and is then directed through an optional optical filter 29 that eliminates any light not at the laser's target wavelength. A person of ordinary skill in the art would readily apprehend that the optional optical filter 29 can be a laser notch filter, bandpass filter, or long or short pass filter. Preferably, the optional optical filter 29 is a laser notch filter.

The laser light continues through the optional optical filter 29 and converges onto and into the non-linear crystal 32. The non-linear crystal has a first face 33 and a second face 34.

In a preferred embodiment, the non-linear crystal 32 is housed in a crystal mount 310 such that its alignment along the optical axis is precise to within 0.1° and stable.

The non-linear crystal 32 is mounted in a crystal mount 310 that rigidly positions the crystal 32 relative to the optical axis. The crystal will output photons that include both the laser's photon wavelength as well as the down-converted output from the non-linear crystal 32, which will generally be twice the wavelength of the laser.

In a preferred embodiment, the thermal element 305, thermal sensor 306, and thermal control circuit 91 allows the temperature of the non-linear crystal element 32 to be increased or decreased to maintain a temperature between 5 degrees Celsius and 90 degrees Celsius, preferably to within 0.1 degrees Celsius. The heating or cooling of the non-linear crystal element 32 allows the wavelength of the down-converted photons to be tuned over a range of 30 to 40 nanometers. As a person of ordinary skill in the art would readily apprehend, the thermal control circuit 91 may be any electrical circuit capable of implementing a proportional-integral-derivative, or PID, control loop, and preferably one that meets the limitations discussed for preferred embodiments.

In a preferred embodiment, the output from the non-linear crystal 32 exits from the second face 34 and is directed toward a dichroic mirror 38. The dichroic mirror 38 separates the remaining laser pump beam from the down-converted photons. The laser pump beam reflects from the dichroic mirror 38 onto other parts of the system, as discussed further hereinafter.

The down-converted photons pass through the dichroic mirror 38 and are directed to an optional tilted window 41. The optional tilted window 41 is preferably designed to compensate for the axial shift in the optical axis introduced by the dichroic mirror, creating compensated down-converted photons. In a preferred embodiment, the tilted window is composed of quartz, but could be any variety of materials, including but not limited to Sapphire, BK7, and Magnesium Fluoride.

Optionally, in a preferred embodiment, the optional tilted window 41 could also be constructed of a material which has opposite birefringence properties compared to the non-linear crystal 32. This material would compensate for any dispersion in the crystal and could be composed of materials, including KTP, $LiTaO_3$, and $YVO_4$ but is most preferably KTP.

The down-converted photons pass through the optional tilted window are, in a preferred embodiment, directed to an optional refining optical filter 44. The optional refining optical filter 44 is comprised of one or more optical filters and removes any remaining laser light or other unwanted light and noise from the signal. The optional refining optical filter 44 can be a laser notch filter, bandpass filter, or long or short pass filter but is most preferably a long pass filter.

The down-converted photons pass through the optional refining optical filter 44 to the bi-photon focusing element 53. The bi-photon focusing element 53 is comprised of one or more lenses mounted relative to a fiber optic connector and mounted in a bi-photon 5-axis alignment mount 56. The bi-photon focusing element 53 concentrates and focuses the light toward the attached fiber optic connector, creating a bi-photon beam 59 that can be efficiently coupled into an attached single or multimode optical fiber.

In a preferred embodiment, the pump beam exiting the non-linear crystal 32 exits from the second face 34, is directed toward a dichroic mirror 38, and reflects down a separate optical path from the down-converted photons. The laser pump beam photons are reflected by the dichroic mirror to create a recycled beam 80. The recycled beam 80 is directed toward an optional polarization rotating recycling wave plate 71. The optional polarization rotating recycling-wave plate 71 is preferably selected in accordance with the laser wavelength, and can be used to reverse the effect of any polarization rotation produced in the optional polarization rotating pre-crystal wave plate 23.

The recycled beam 80 passes through the optional polarization rotating recycling wave plate 71 and is directed into an optional recycling optical focusing assembly 74. The optional recycling optical focusing assembly 74 is comprised of one or more optical lenses. The optional recycling optical focusing assembly 74 is preferably mounted in an optional third translating mount 77 that allows the focus to be carefully adjusted. In a preferred embodiment, the x-translation, y-translation, tip, tilt, and distance of the focus can all be adjusted through six alignment screws in the mount, and the final alignment can be locked in place through set screws.

The optional recycling optical focusing assembly 74 allows the recycled beam 80 to be focused and launched into an optical fiber. The optical fiber containing the recycled beam 80 can then optionally be used to excite the non-linear crystal 32 a second time, creating a temporal uncertainty that is useful for various forms of quantum entanglement, or optionally can be directed to a second system to generate additional photons, in which case that process can be repeated many times, greatly extending the application of the laser source. In other embodiments, the recycled beam 80 could be used to monitor phase relations between the system and one or more other systems.

The first translating mount 17, optional phase shifting wave plate 18, optional polarization rotating pre-crystal wave plate 20, optional optical filter 29, and crystal mount 310 are held rigidly in place. In a preferred embodiment, that is accomplished in part by a cage design consisting of a first set of four bars connected at different points between the first translating mount 17 and the crystal mount 310, one of which is indicated at 19.

The crystal mount 310, dichroic mirror 38, optional tilted window 41, optional refining optical filter 44, and bi-photon 5-axis alignment mount 56 are held rigidly in place. In a preferred embodiment, that is accomplished in part by a cage design consisting of a second set of four bars connected at different points between the crystal mount 310 and the bi-photon 5-axis alignment mount 56, one of which is indicated at 39.

The optional polarization rotating recycling wave plate 71 and optional third translating mount 77 are also held rigidly in place. In a preferred embodiment, that is accomplished in part by a cage design consisting of a third set of four bars, one of which is indicated at 78, that span between the second set of four bars, one of which is indicated at 39, and the optional third translating mount 77.

Most preferably, the first, second, and third cages are also held in place by rigid mounting of the components to a plate 86. A light-tight housing encompasses the entire assembly and mounts to the plate 86.

Figure 5:
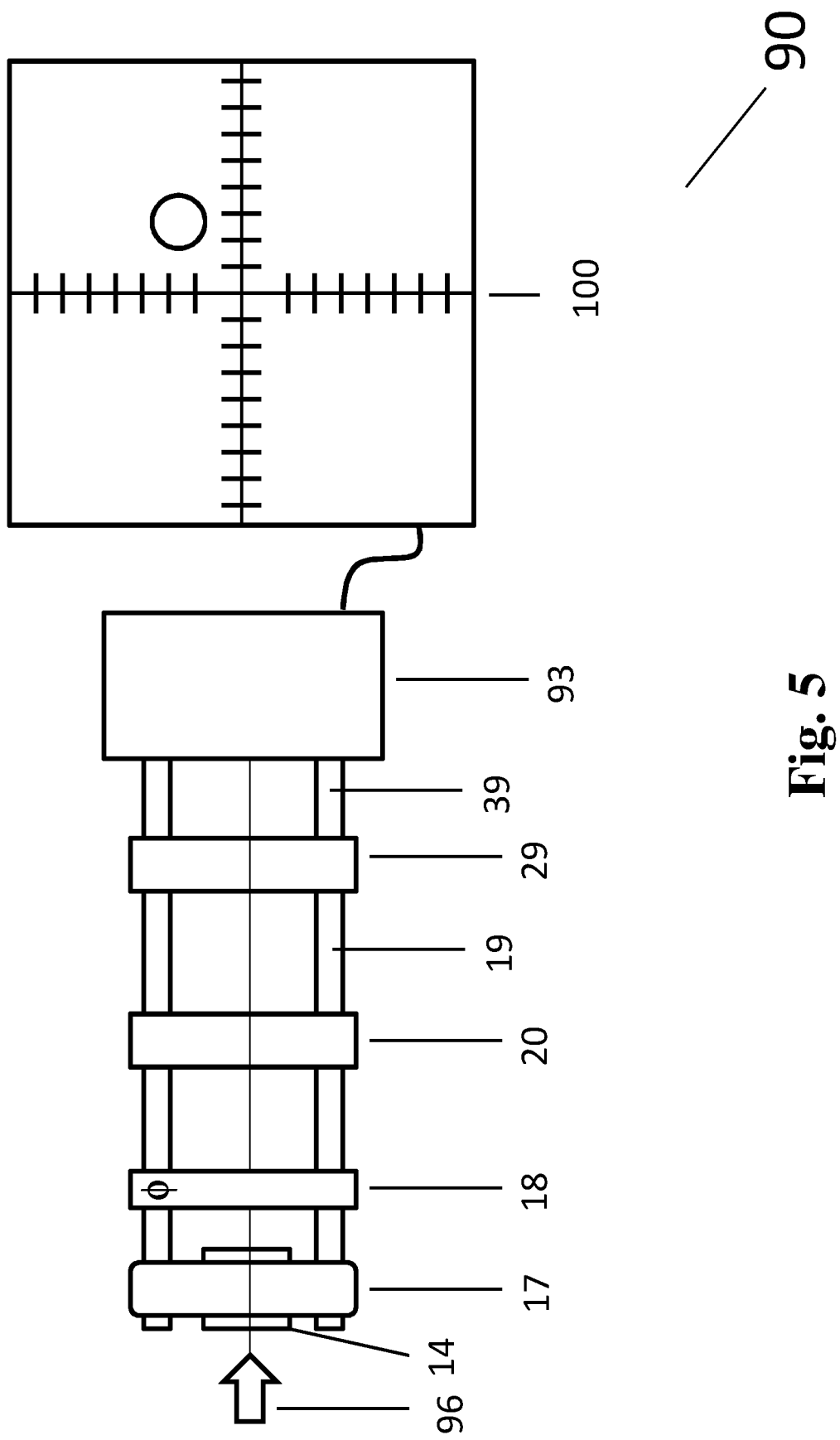
FIG. 5 depicts an exemplary alignment of one sub-assembly of the system to generate bi-photons—referred to herein as "the source side."
Figure 6:
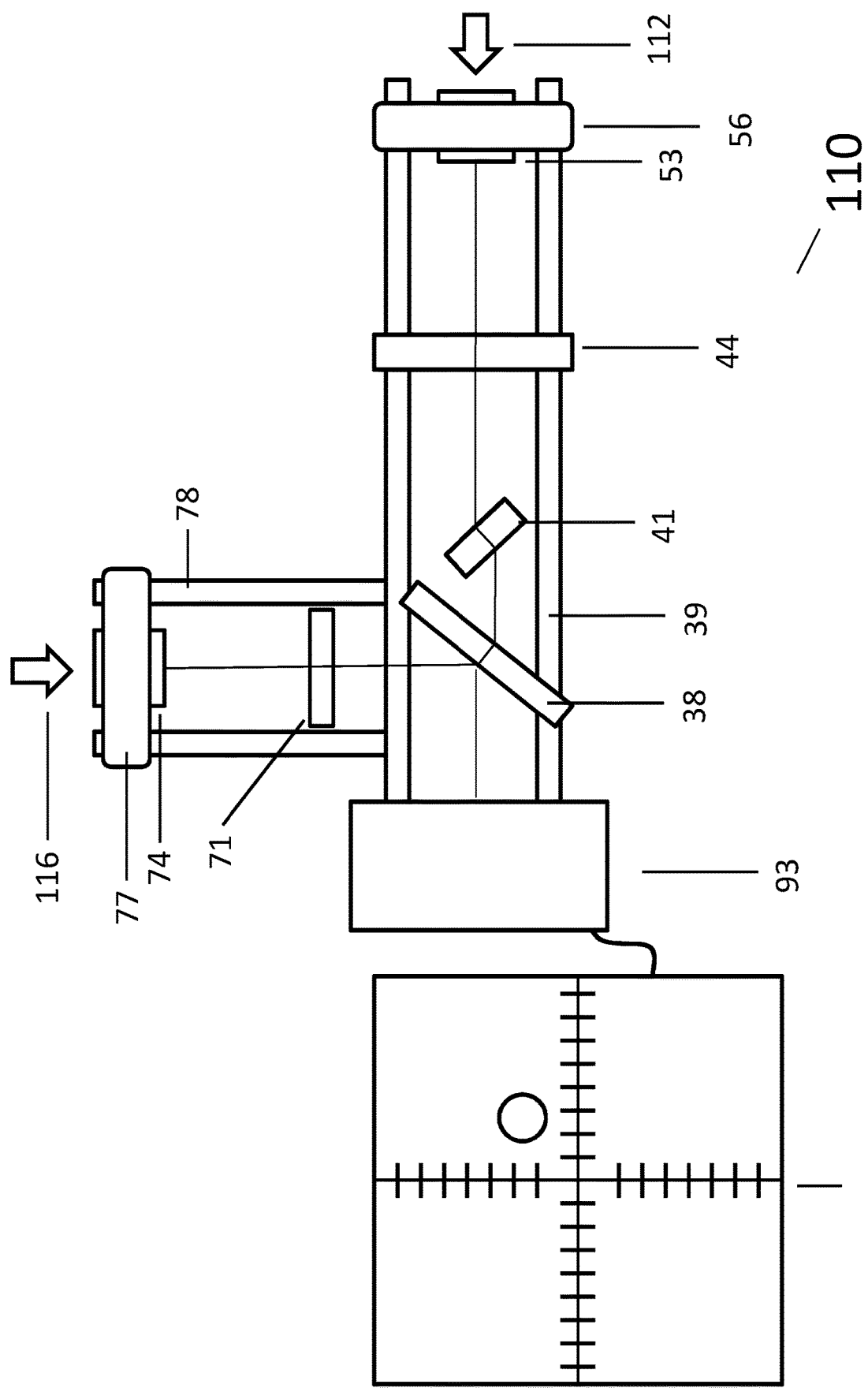
FIG. 6 depicts an exemplary alignment of a second sub-assembly of the system to generate bi-photons—referred to herein as "the receiver side."

FIG. 5 and FIG. 6 depict an aspect of the present invention related to the manner of aligning the system to generate bi-photons 10.

In a preferred embodiment, alignment of the system 10 is achieved through a three-stage process.

The first phase of the alignment is depicted in FIG. 5. In a preferred embodiment, the source side subassembly 90 comprises the optical fiber focusing device 14, the first translating mount 17, a set of four bars, one of which is indicated at 19, and a beam profiler 93 placed such that its detection surface is at the precise focal length at which the mid-point between the first face 33 and the second face 34 of the non-linear crystal 32 will be located in the assembled system 10.

Optionally, as discussed above, the first sub-assembly may comprise one or more of the following: an optional phase shifting wave plate 18, the optional optical filter 20, and/or an optional polarization rotating pre-crystal wave plate 29.

Light from a fiber optic laser 96 of the same wavelength that will be used for the pump beam 11 is directed at the same location on the surface of the optical fiber focusing device 14 of the source side sub-assembly 90 to produce a focused spot of light that is detected by the beam profiler 93. As is readily appreciated by persons of ordinary skill in the art, the beam profiler 93 can then determine the location, diameter, optical power, and divergence of the spot, as partially schematically illustrated as the beam profiler output 100.

Although the beam profiler output 100 is schematically illustrated in FIG. 5, persons of ordinary skill in the art will readily apprehend that beam profilers can and do output data in a variety of formats, providing, as noted above, a great deal more information than location and diameter. The schematic illustration is provided for graphic illustration and is not intended to convey the full output available nor limit the teachings of the present invention in any manner.

The output from the beam profiler 93 is then monitored as alignment adjustments are made to the translating mount 17 and used to exactly focus the light from fiber optic laser 96 so that the light will be maximally-focused through the optical fiber focusing device 14, the optional phase shifting pre-crystal variable, if present 18, the optional optical filter, if present 20, and the optional polarization rotating pre-crystal wave plate, if present 29, at the focal distance to be utilized when the beam profiler 93 is removed and replaced by the non-linear crystal 32 in its mount 310.

The second phase of the alignment is illustrated in FIG. 6. In a preferred embodiment, the receiver side subassembly 110 comprises the beam profiler 93, the dichroic mirror 38, the bi-photon 5-axis alignment mount 56, and a set of four bars, one of which is indicated at 39. The beam profiler 93 is placed such that its detection surface is at the precise focal length at which the mid-point between the first face 33 and the second face 34 of the non-linear crystal 32 will be located in the assembled system 10.

Optionally, as discussed above, the receiver side sub-assembly may comprise one or more of the following: a recycling optical focusing assembly 74, a translating mount 77, a tilted window 41, and a refining optical filter 44.

Light from a fiber optic laser 112 of the same wavelength as that anticipated for the down-conversion beam 59 is directed at the same location on the surface of the bi-photon focusing device 53 of the receiver side sub-assembly 110 to produce a focused spot of light that is detected by the beam profiler 93. As is readily appreciated by persons of ordinary skill in the art, the beam profiler 93 can then determine the location, diameter, optical power, and divergence of the spot, as partially schematically illustrated as the beam profiler output 102.

The output from the beam profiler 93 is then monitored as alignment adjustments are made to the translating mount 56 and used to exactly focus the light from fiber optic laser 112 so that the light will be maximally-focused through the bi-photon focusing device 53, the optional refining optical filter, if present 44, the optional tilted window, if present 41, and the dichroic mirror 38 at the focal distance to be utilized when the beam profiler 93 is removed and replaced by the non-linear crystal 32 in its mount 310.

The bi-photon focusing element 53 is aligned. Bi-photon focusing element tuning light 112 is introduced. The bi-photon focusing element tuning light 112 is light from a laser with a wavelength equal to the down-converted photons to be produced, introduced at the spot on the bi-photon focusing element 53 that will emit the down-converted photons in the final assembly. That light will pass through the assembled elements and a portion will eventually reach the beam profiler 93. As explained previously, the beam profiler will produce and display data regarding the location, diameter, optical power, and divergence of the spot, as partially schematically illustrated as the beam profiler output 102. Adjustments to the bi-photon 5-axis alignment mount 56 can be made to focus the beam onto the beam profiler 93 and optical axis of the second sub-assembly 110.

If the optional recycling optical focusing assembly 74 and optional translating mount 77 are present, light from a fiber optic laser 116 of the same wavelength as the recycled beam 80 is directed at the same location on the surface of the recycling optical focusing assembly 74 of the receiver side sub-assembly 110 to produce a focused spot of light that is detected by the beam profiler 93. As is readily appreciated by persons of ordinary skill in the art, the beam profiler 93 can then determine the location, diameter, optical power, and divergence of the spot, as partially schematically illustrated as the beam profiler output 102.

The output from the beam profiler 93 is then monitored as alignment adjustments are made to the translating mount 77 and used to exactly focus the light from fiber optic laser 116 so that the light will be maximally-focused through the optional polarization rotating recycling wave plate, if present 71, and reflected from the dichroic mirror 38 at the focal distance to be utilized when the beam profiler 93 is removed and replaced by the non-linear crystal 32 in its mount 310.

As explained previously, the beam profiler will produce and display data regarding the location, diameter, optical power, and divergence of the spot, as partially schematically illustrated as the beam profiler output 102. Adjustments to the recycling optical focusing assembly, if present 74, can be made to focus the beam onto the beam profiler 93 and optical axis of the receiver side sub-assembly 110.

The third phase of alignment and assembly is then performed. The beam profiler 93 is removed from the sub-assembly(ies). The fixed mount 310 containing the non-linear crystal 32 is then affixed between the source side and receiver side sub-assemblies as illustrated in FIG. 3 and FIG. 4, where the beam profiler 93 had been during the assembly and alignment of the source side and receiver side sub-assemblies.

Light at the pump wavelength 11 is brought into the system 10 as discussed above and focused onto the non-linear crystal 32. The laser light is visible on the first face 33 and is translated in the x and y axis, using x and y adjustments in the translating mount 17, but not the focal axis, to visually center the focal spot onto the first face 33 of the non-linear crystal.

The bi-photon beam 59, and/or recycled beam 80, are then collected into optical fibers and connected to detectors. The x and y translation of the focusing elements can then be tuned. The x and y translation of the bi-photon focusing element 53 can be optimized by adjusting the x and y translation in the bi-photon 5-axis alignment mount 56 to optimize the bi-photon collection as desired. The x and y translation of the recycling optical focusing assembly 74 can be optimized by adjusting the x and y translation in the third translating mount 77 to optimize the collection of the recycled beam 80 as desired.

In a preferred embodiment, the bi-photon beam 59 is directed to a fiber optic beamsplitter that splits the bi-photons into two separate optical fibers. The two separate optical fibers are then directed to two single photon counting detectors. The output of the detectors are then monitored with a coincidence counter. The coincidence counter can determine when photons have arrived simultaneously at these two detectors. The coincidence rate of the two detector outputs can then be monitored and maximized through x and y translation adjustments on the bi-photon 5-axis alignment mount 56.

Most preferably, when fully aligned, the mounts are locked in place through set screws on each mount's alignment screws. The housing for the assembly is then positioned in place and attached to the systems base plate 86, preferably with screws. The systems base plate 86 and housing serve to protect the optics and preserve the alignment within while also eliminating unwanted outside light from being collected into the optics.

Using the system and methods disclosed herein permits production of bi-photons at a rate as high as 1 million pairs per second per mW of pump power with a 30 mm long PPKTP crystals. Using the system and methods disclosed herein permits a single system to produce bi-photons that can be coupled into a single optical fiber. The spectrum of the produced bi-photons can be tuned by adjusting the maintained temperature of the non-linear crystal element 32.

Figure 7:
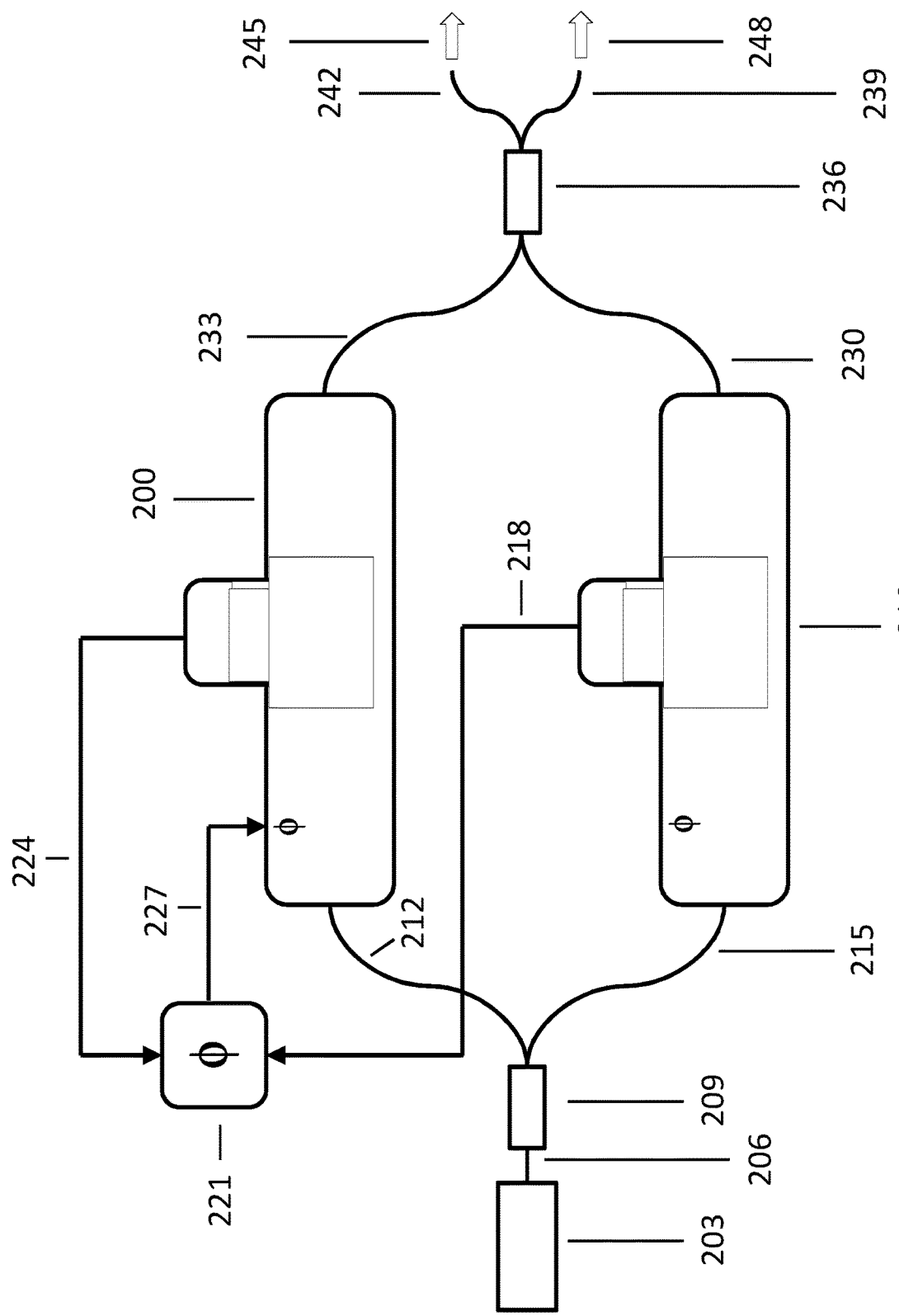
FIG. 7 depicts an exemplary array used to generate bi-photon pairs which are being excited by the same pump beam. In the depicted example, the outputs of the two systems are combined for the purpose of producing quantum entangled photons in a selectable "bell state."

As illustrated schematically in FIG. 7, two systems for generating bi-photons can be driven from the same pump beam to create a combined output of photons in a quantum entangled state. In such embodiments, a first system 210 is assembled in accordance with the present invention. As discussed previously, that system may be system 10, as illustrated in FIG. 3 without the optional elements, or may be a system with one or more of the optional elements illustrated in FIG. 4. Most preferably, system 210 is a system as illustrated in FIG. 4. Similarly, in such embodiments, a second system 200 is also utilized. System 200 may be system 10, as illustrated in FIG. 3 without the optional elements, or may be a system with one or more of the optional elements illustrated in FIG. 4. Most preferably, system 200 is a system as illustrated in FIG. 4.

In a preferred embodiment, a pump laser 203 provides light through a polarization-maintaining optical fiber 206 to a polarization-maintaining fiber optic splitter 209. The fiber optic splitter 209 produces two copies of the pump beam, each of which is connected through optical fibers to each of the bi-photon generating systems 210, 200. In a preferred embodiment, both systems 200 and 210 are identical. Most preferably, both systems 200 and 210 comprise an optional phase shifting wave plate 18. Most preferably, the systems 200 and 210 are systems as illustrated in FIG. 4.

In this embodiment, the pair of bi-photons produced by a single unit's non-linear crystal would have opposite polarization and would be coupled into a single outgoing optical fiber. The bi-photons emitted by system 210 would be coupled into fiber 230. The bi-photons emitted by system 200 would be coupled into fiber 233. The output fibers 230 and 233 would be combined at a 2×2 fiber optic polarization beamsplitter 236. The outputs from the fiber optic polarization beamsplitter's output fibers 242 and 239 would contain the polarization entangled photons that could be made into any "bell state" (outputs 245 and 248).

In order to construct and maintain a stable output in a particular "bell state" or other quantum state, the phase difference between the two pump beams' exciting systems must be monitored and maintained. To do this, the recycled outputs of the pump laser beam from systems 210 and 200 are preferably coupled into single-mode polarization-maintaining optical fibers 218 and 224. These fibers direct the recycled outputs to a phase monitoring and control system 221. In a preferred embodiment, the phase monitoring control system is a Mach-Zehnder interferometer, such as one commercially-available from Thorlabs, that would provide a measurement of the phase difference between the pump beams of the two systems 200 and 210. In a preferred embodiment, the output from the phase monitoring control system would be fed back through an electrical coaxial cable 227 into the optional phase shifting wave plates 18 of either system 210 (as illustrated in FIG. 8) or system 200. Most preferably, the optional phase shifting wave plate 18 is electronically adjustable to compensate for any fluctuation in phase difference between the photons generated by system 200 and system 210.

While the invention has been described and exemplified in sufficient detail for those skilled in this art to make and use it, various alternatives, modifications, and improvements should be apparent without departing from the spirit and scope of the invention. The examples provided herein are representative of preferred embodiments, are exemplary, and are not intended as limitations on the scope of the invention. Modifications therein and other uses will occur to those skilled in the art. These modifications are encompassed within the spirit of the invention and are defined by the scope of the claims.

It will be readily apparent to a person skilled in the art that varying substitutions and modifications may be made to the invention disclosed herein without departing from the scope and spirit of the invention.

All patents and publications mentioned in the specification are indicative of the levels of those of ordinary skill in the art to which the invention pertains. All patents and publications are herein incorporated by reference to the same extent as if each individual publication was specifically and individually indicated to be incorporated by reference.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

Other embodiments are set forth within the following claims.

I claim:

1. A device for generating bi-photons, comprising:
a first and a second bi-photon system, each of the bi-photon systems comprising
a nonlinear crystal element and a crystal holder configured and arranged to mechanically support the nonlinear crystal element, wherein the nonlinear crystal element comprises a first face, a second face parallel to the first face, and a first axis perpendicular to the first and second faces, and wherein the nonlinear crystal element is potted in an elastomer potting material that provides a thermal pathway between the nonlinear crystal element and the crystal holder, wherein the potting material has an index of refraction lower than the index of refraction of the non-linear crystal;
a thermal element operably connected to the crystal holder configured and arranged to heat and/or cool the crystal holder and the nonlinear crystal element;
a thermal sensor operably connected to the crystal holder and configured and arranged to measure the temperature of the crystal holder and/or the nonlinear crystal element;
a thermal control circuit operably connected to the thermal sensor and the thermal element and configured and arranged to control the temperature of the crystal holder to within +/−0.1 degrees Celsius;
a crystal holder mount configured and arranged to mechanically support the crystal holder and thermally isolate the crystal holder from the rest of the device components;
a pump focusing optic configured and arranged to receive a pump beam and to produce therefrom a converging pump beam and provide translational adjustment of the position of the converging pump beam relative to the first axis, the converging pump beam traversing a first optical path to a first face of the nonlinear crystal element along the first axis, the nonlinear crystal element providing down-conversion of a subset of photons in the pump beam, resulting in a beam of down-converted bi-photons and a beam of non-down-converted photons along the first axis;
an optical element comprising a dichroic reflector configured and arranged to receive photons exiting a second face of the nonlinear crystal element along the first axis and to direct down-converted bi-photons to a third optical path along the first axis, and to reflect non-down-converted photons to a fourth optical path along a third axis; and
a bi-photon focusing optic configured and arranged to collect the down-converted photons into an optical fiber and provide adjustment of the optical fiber's optical axis relative to the first axis;
a photon source configured and arranged to produce the pump beam;

a polarization-maintaining fiber optic splitter operably connected to the pump laser and to each of the first and a second bi-photon systems, wherein the polarization-maintaining fiber optic splitter is configured and arranged to receive photons generated by the pump laser and to generate therefrom separate pump beams for each of the first and a second bi-photon systems; and a 2×2 fiber optic polarization beam splitter operably connected to the bi-photon focusing optic of each of the first and a second bi-photon systems, wherein the 2×2 fiber optic polarization beam splitter is configured and arranged to receive from both the first and second bi-photon systems a down-converted photon pair at its two input ports, creating from the received down-converted photon pair an entangled quantum state consisting of a first down-converted photon that exits from a first output port of the 2×2 fiber optic polarization beam splitter and a second down-converted photon that exits from a second output port of the 2×2 fiber optic polarization beam splitter.

2. A device according to claim 1, where-in the thermal element is a thermoelectric device.

3. A device according to claim 1, where-in the thermal element is a resistive heater.

4. A device according to claim 1, where-in the thermal control circuit is based on a PID loop.

5. A device according to claim 1, further comprising a half wave plate positioned in the first optical path between the photon source and the first face of the nonlinear crystal element, the half wave plate configured to adjustably modify a polarization state of the pump beam, thereby altering the efficiency of down-converted photon production by the system.

6. A device according to claim 5, further comprising an optical retarder positioned in the first optical path between the photon source and the first face of the nonlinear crystal element.

7. A device according to claim 6, wherein the optical retarder is an electronically variable wave plate, the electronically variable wave plate configured to allow only modification of the optical phase of the polarized pump beam, thereby altering the optical phase of the down-converted photons.

8. A device according to claim 7, wherein the optical retarder is positioned between the photon source and the half wave plate.

9. A device according to claim 1, further comprising a filter positioned in the first optical path between the photon source and the nonlinear crystal element, the filter configured to remove non-pump wavelengths of light from reaching the crystal.

10. A device according to claim 1, wherein the potting material is silicone-based rubber.

11. A device according to claim 1, wherein the nonlinear crystal element produces Type 0 down-conversion.

12. A device according to claim 1, wherein the nonlinear crystal element produces Type I down-conversion.

13. A device according to claim 1, wherein the nonlinear crystal element produces Type II down-conversion.

14. A device according to claim 1, wherein the fourth optical path comprises an optical element configured to focus the non-down-converted photons onto an end of a second optical fiber.

15. A device according to claim 1, wherein the first bi-photon system is operatively connected to the second bi-photon system to provide non-down-converted photons from the fourth optical path as the photon source to the second bi-photon system.

16. A device according to claim 1, wherein the fourth optical path is operatively connected to the first optical path to combine non-down-converted photons from the fourth optical path with the pump beam directed along the first optical path.

17. A device according to claim 1, further comprising a phase monitoring and control system comprising an interferometer configured and arranged to measure a phase difference in the pump beams of the first and second bi-photon systems, and a phase shifting wave plate within the first optical path of each of the first and second bi-photon systems configured and arranged to adjust the phase difference of the pump beam to compensate for fluctuations in the phase difference in the pump beams of the first and second bi-photon systems measured by the interferometer.

* * * * *